United States Patent [19]

Akabane

[11] Patent Number: 4,584,795

[45] Date of Patent: Apr. 29, 1986

[54] NUMERICAL CONTROL GRINDING MACHINE FOR GRINDING A TAPER PORTION OF A WORKPIECE

[75] Inventor: Hitoshi Akabane, Anjo, Japan

[73] Assignee: Toyoda Koki Kabushiki Kaisha, Kariya, Japan

[21] Appl. No.: 713,819

[22] Filed: Mar. 20, 1985

[30] Foreign Application Priority Data

Mar. 22, 1984 [JP] Japan ............................. 59-55486

[51] Int. Cl.$^4$ ............................................. B24B 49/02
[52] U.S. Cl. .................................. 51/165.71; 51/94 R; 51/105 SP; 51/289 R; 51/327
[58] Field of Search ............ 51/94 R, 105 SP, 165.71, 51/289 R, 96, 327; 364/474

[56] References Cited

U.S. PATENT DOCUMENTS

| | | | |
|---|---|---|---|
| 1,145,816 | 7/1915 | Steiner | 51/240 A |
| 3,104,501 | 9/1963 | Price | 51/94 R |
| 3,762,102 | 10/1973 | Vetter | 51/105 SP |
| 4,205,488 | 6/1980 | Englander et al. | 51/105 SP |

*Primary Examiner*—Harold D. Whitehead
*Attorney, Agent, or Firm*—Oblon, Fisher, Spivak, McClelland & Maier

[57] ABSTRACT

In a numerical control grinding machine, a workpiece with a taper portion to be ground is rotatably supported on a swivel table which is mounted on a traverse table to be pivotable about a pivot. For grinding the taper portion, the traverse table is moved to bring a reference end surface of a workpiece into engagement with a measuring device, and a numerical controller detects a deviation of the pivot from a corresponding position in the case of a workpiece model. The numerical controller is in advance given a reference table feed amount, a reference swivel pivot angle and a reference wheel feed amount through which the traverse table, the swivel table and the grinding wheel would be moved respectively after the reference end surface is brought into engagement with the measuring device, to precisely grind a corresponding taper portion of the workpiece model if the same were supported on the swivel table. The numerical controller compensates the reference table feed amount and the reference wheel feed amount for the detected deviation and then, controls movements of said traverse table, the swivel table and the grinding wheel based upon the compensated table feed amount, the reference swivel pivot angle and the compensated wheel feed amount, whereby the taper portion of the workpiece can be ground to a desired dimension at a position spaced from the reference end surface a predetermined distance.

5 Claims, 14 Drawing Figures

NUMERICAL CONTROL GRINDING MACHINE FOR GRINDING A TAPER PORTION OF A WORKPIECE

BACKGROUND OF THE INVENTION

1. Field of the Invention

The present invention relates to a numerical control grinding machine for precisely grinding a taper portion of a workpiece through pivot movement of a swivel table.

2. Description of the Prior Art

In performing a taper grinding in a numerical control grinding machine, as shown in FIGS. 1 through 3, a workpiece W is rotatably carried by a center 3 mounted on a work head 1 and another center 4 mounted on a tail stock (not shown). The workpiece W is formed with a reference end surface Wa, and a taper portion Wb of a length (a) is formed at a position which is spaced a distance (A) from the reference end surface Wa.

The taper portion Wb is ground with a grinding wheel G, with the workpiece W being held in a state indicated by the phantom line in FIG. 3. The procedure of such grinding will be described hereafter. First of all, the workpiece W held as indicated by the solid line in FIG. 1 is moved to a position indicated by the phantom line in FIG. 1, by moving a traverse table (not shown) toward the left. This feed amount of the traverse table is such a predetermined amount that the reference end surface Wa passes through a position (f) where an end of a feeler F of an end surface measuring device (not shown) is located. This measuring device is fixedly provided on a grinding machine bed (not shown), and the feeler F is movable toward and away from the workpiece W in a radial direction of the workpiece W. The movement of the traverse table causes a pivot P (shown by the broken line) fixedly provided in the traverse table to move the same amount to a position indicated by the phantom line in FIG. 1.

Subsequently, as shown in FIG. 2, the feeler F is advanced toward the workpiece W, and then, a ram 2 of the work head 1, the centers 3 and 4 and the workpiece W are bodily moved toward the right until the reference end surface Wa is brought into engagement with the feeler F. During this time, the traverse table and the pivot P remain at the same positions.

When the end surface measuring device generates a signal upon engagement of its feeler F with the reference end surface Wa, the traverse table is moved a distance (B) toward the left to locate the workpiece W at a position indicated by the solid line in FIG. 3. At this time, the pivot P is also moved the same amount (B) toward the left.

Thereafter, a swivel table (not shown) mounted on the traverse table is pivoted about the pivot P to pivotally move together with the work head 1, the ram 2 and the centers 3, 4 the workpiece W to a position indicated by the phantom line in FIG. 3. In this state, the grinding wheel G is advanced as indicated by the phantom line, whereby the taper portion Wb can be ground.

As described above, in the prior art apparatus, since the axial positioning of the workpiece W is performed utilizing movement of the ram 2, the position of the pivot P is maintained at a predetermined position regardless of any deviation of the axial position of the reference end surface Wa from an ideal axial position. Consequently, when the swivel table is pivoted a predetermined amount about the pviot shaft P which is held at a predetermined position and the grinding wheel G is advanced a predetermined amount to grind the taper portion Wb of the workpiece W, the length (A) (which is required to be precise) from the reference end surface Wa to the starting point of the taper portion Wb can be made constant with respect to all of workpieces machined therein.

However, prior art apparatus uses the work head 1 which is specially designed to axially move the ram 2 carrying the center 3, thereby resulting in an increased cost of production.

SUMMARY OF THE INVENTION

Accordingly, it is a primary object of the present invention to provide an improved numerical control grinding machine capable of precisely grinding a taper portion of a workpiece without using any specially designed work head.

Another object of the present invention is to provide an improved numerical control grinding machine in which feed amounts of a traverse table and a grinding wheel in a taper grinding operation are compensated for a deviation of a pivot for a swivel table from an ideal position which deviation occurs when a traverse table is initially moved to detect the relative position of a workpiece with the grinding wheel.

Briefly, according to the present invention, there is provided a numerical control grinding machine having a numerical controller which is designed for precisely grinding a taper portion of a workpiece. In the grinding machine, the workpiece is rotatably supported by a support device on a swivel table, and this swivel table is pivotably mounted on a traverse table which is movable on a bed. In grinding the taper portion, the numerical controller controls a traverse feed device to move the traverse table from an original position until a reference end surface of the workpiece is brought into engagement with a measuring device mounted on the bed. The numerical controller detects a feed amount through which the traverse table is moved from the original position until the reference end surface is brought into engagement with the measuring device, so as to calculate a deviation of the position of a pivot for the swivel table from an ideal position. This ideal position is defined as a position to which the pivot would be positioned when the reference end surface is brought into engagement with the measuring device if a workpiece model were supported by the support device. After engagement of the reference end surface with the measuring device, the numerical controller controls feed devices of the traverse table, the swivel table and the grinding wheel so as to grind the taper portion of the workpiece. During this control operation, the numerical controller compensates feed amounts of the traverse table and the grinding wheel for the calculated deviation, whereby the taper portion can be ground to a desired dimension.

With this configuration, since the deviation of the swivel table pivot from the ideal position can be cancelled by compensating the feed amount of the traverse table and the grinding wheel therefor, there is not required any work head which is specially designed for axially moving a ram with a center relative thereto. This advantageously results in reducing the manufacturing cost of the grinding machine.

BRIEF DESCRIPTION OF THE ACCOMPANYING DRAWINGS

The foregoing and other objects, features and many of the attendant advantages of the present invention will be readily appreciated as the same becomes better understood by reference to the following detailed description of a preferred embodiment when considered in connection with the accompanying drawings, wherein like reference numerals designate identical or corresponding parts throughout the several views, and in which.

DETAILED DESCRIPTION OF A PREFERRED EMBODIMENT

Figure 1:
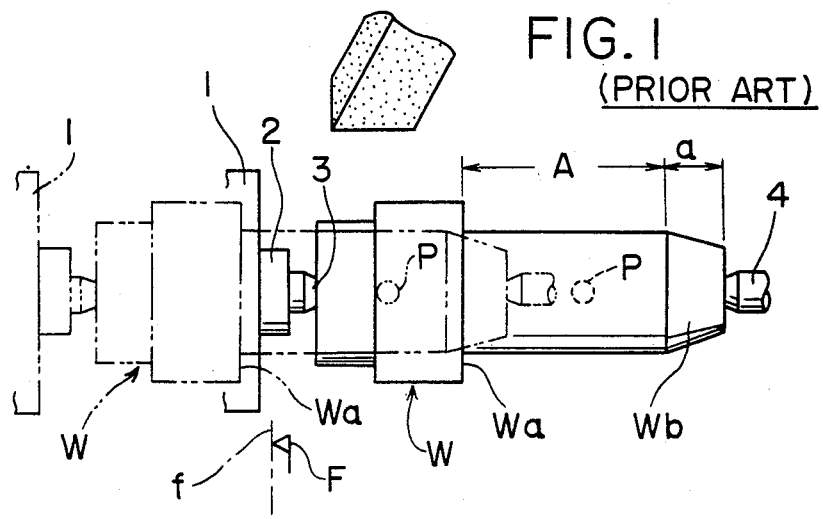
FIGS. 1, 2 and 3 are explanatory views illustrating operational steps in grinding a taper portion of a workpiece in a known numerical control grinding machine.
Figure 2:
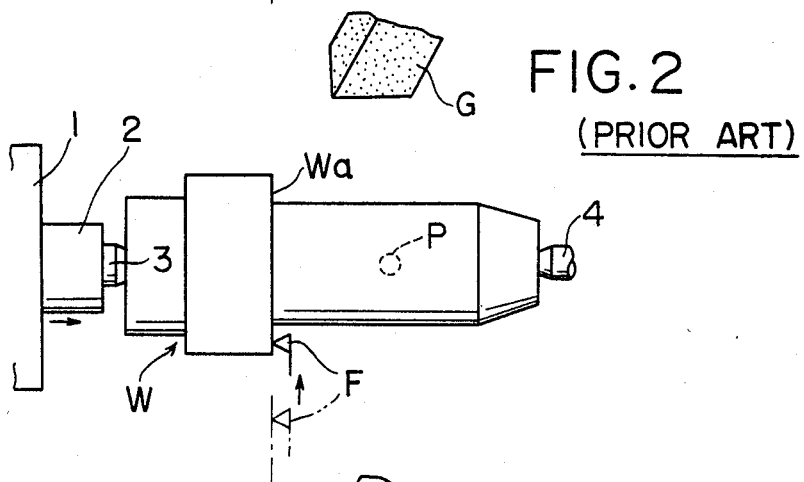
Figure 3:
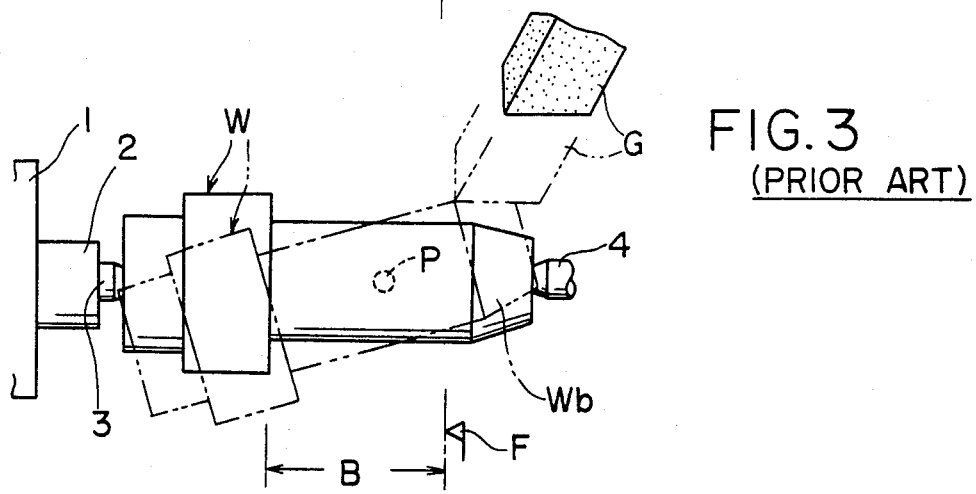
Figure 4:
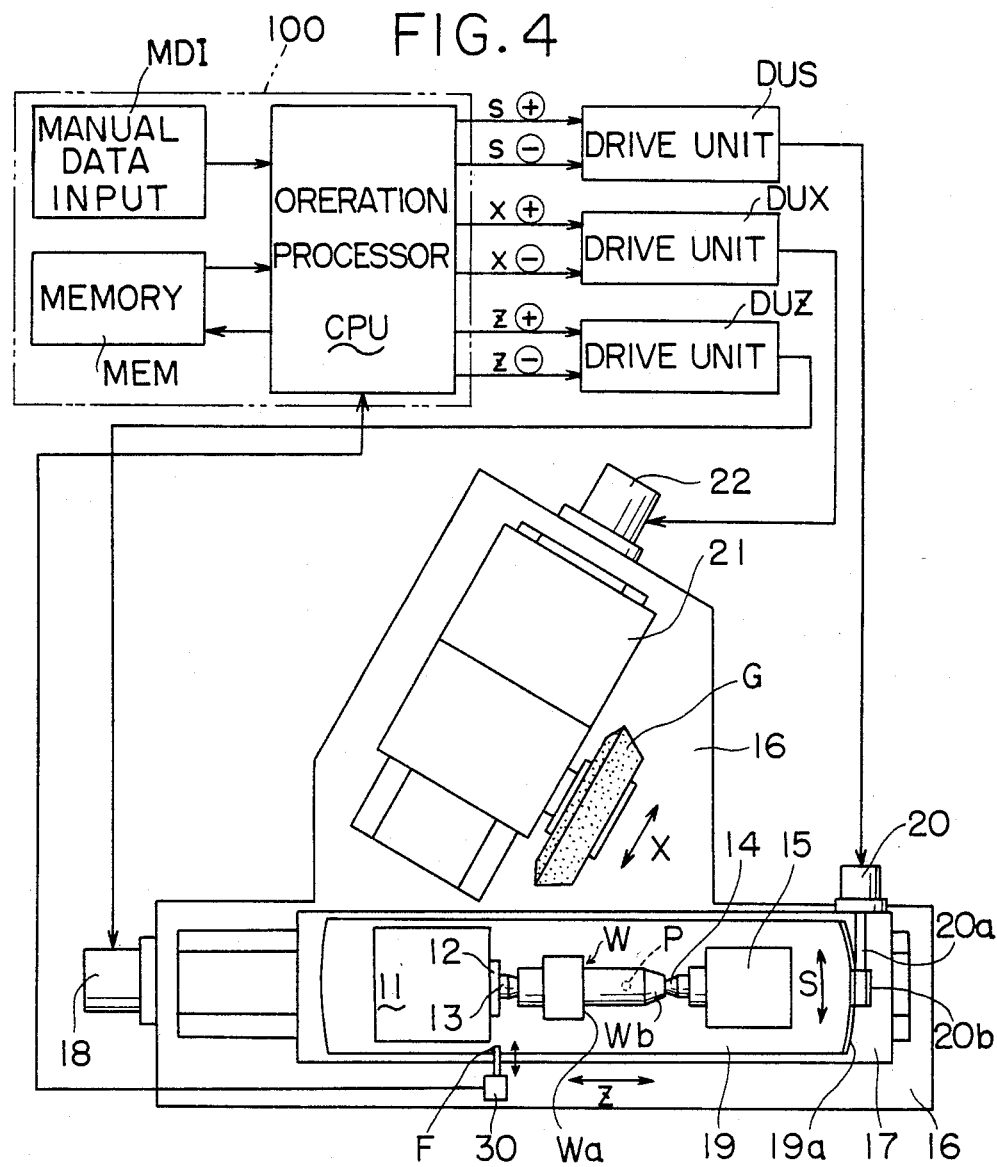
FIG. 4 is a plan view of a numerical control grinding machine according to the present invention, also showing a block diagram of a numerical controller used for the machine.
Figure 5:
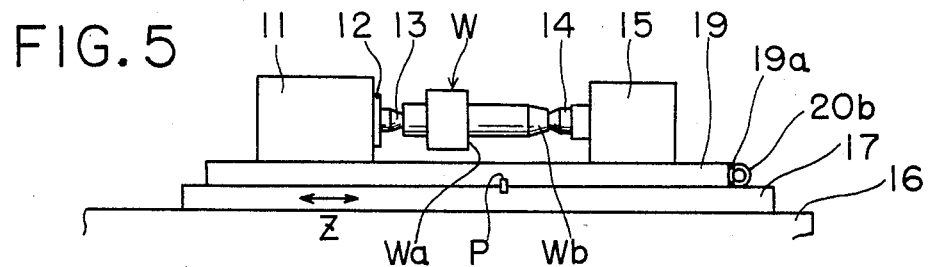
FIG. 5 is a fragmentary front view of the grinding machine shown in FIG. 4.

In FIGS. 4 and 5 illustrating an embodiment of the present invention, the same or identical numerals and symbols are used to designate elements which are identical with those of the prior art apparatus shown in FIGS. 1-3. A workpiece W is rotatably carried by means of centers 13 and 14 at its opposite ends. The center 13 is received in a support spindle 12 fixedly mounted in the work head 11, and the support spindle 12 is prevented from rotating and axially moving. That is, the work head 11 is not of the special construction as used in the prior art apparatus, but of a conventional dead-center type. On the other hand, the center 14 is carried by a tail stock 15 and is axially movable for setting up the workpiece W.

The work head 11 and the tail stock 15 are mounted on a bed 16 through a traverse table 17 and a swivel table 19. The traverse table 17 is movable by a Z-axis servomotor 18, secured to a left end surface of the bed 16, in a Z-axis direction. The swivel table 19 on the traverse table 17 is pivotable about a pivot P. This pivot movement is given by the operation of an S-axis servomotor 20 secured to a lateral side of the traverse table 17, because a worm 20b provided on an output shaft 20a of the servomotor 20 is in meshing engagement with a wormwheel sector 19a secured to a right end of the swivel table 19.

A wheel head 21 is also mounted on the bed 16 and is movable in an X-axis direction which intersects the Z-axis direction at an acute angle. A grinding wheel G is carried by the wheel head 21 to be rotatable about an axis perpendicular to the X-axis direction. The reciprocative movement of the wheel head 21 in the X-axis direction is given by an X-axis servomotor 22 secured to the rear side of the bed 16.

Figure 6:
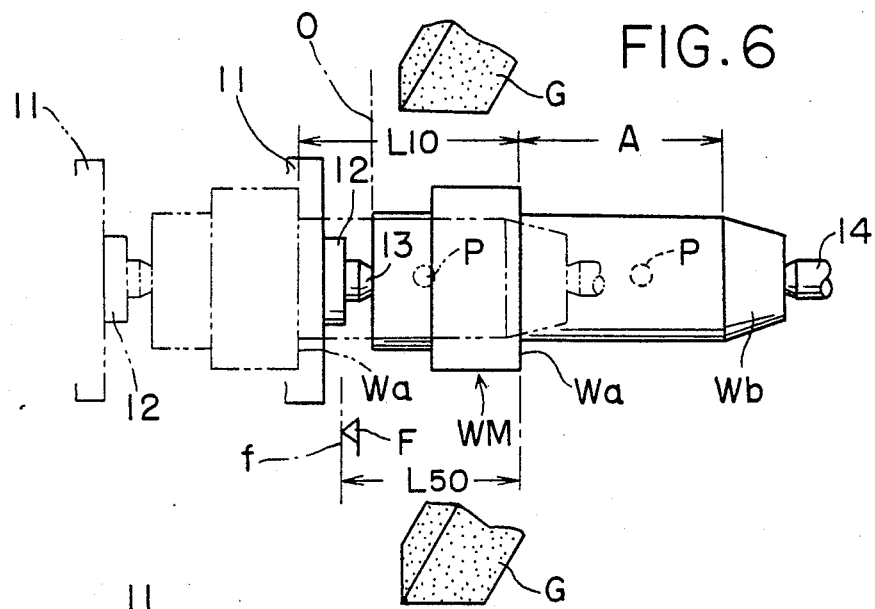
FIGS. 6, 7 and 8 are explanatory views illustrating operational steps in grinding a taper portion of a workpiece model in the grinding machine according to the present invention.

The procedure of grinding a taper portion Wb of the workpiece W will be described hereafter. It is usual that the location of a reference end surface Wa of the workpiece W is not constant due to errors in machining. Therefore, first of all, a workpiece model which has been machined to have ideal dimensions is taken into consideration, and the procedure of grinding such a workpiece model will be described with reference to FIGS. 6-8. FIG. 6 shows a state in which a workpiece model WM and the work head 11 are moved to positions indicated by the phantom line by moving the traverse table 17 a distance L10 from an original position 0 toward the left after the workpiece model WM is set between the centers 13 and 14 as indicated by the solid line. The distance L10 is a distance which is sufficient to position the reference end surface Wa left of a feeler F of an end surface measuring device 30 fixedly mounted on the bed 16 and is predetermined in advance.

Figure 7:
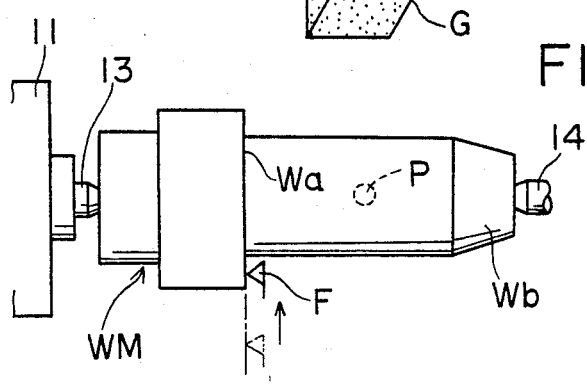
Figure 8:
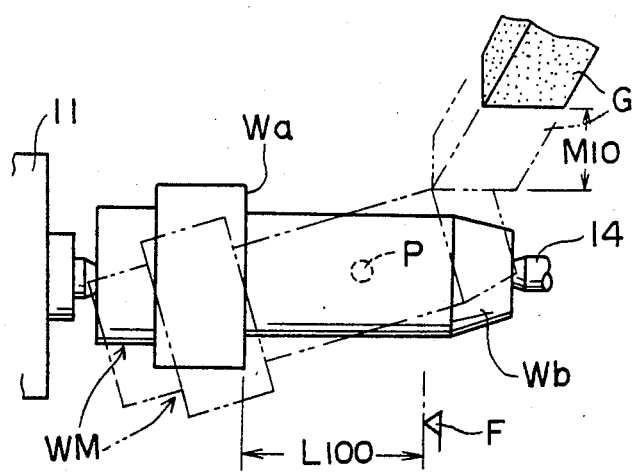

FIG. 7 shows a state wherein the workpiece model WM is then moved until the reference end surface Wa is brought into contact with the feeler F (which has been advanced to the position shown by the solid line), by moving traverse table 17 toward the right. In this case, an amount L50 through which the reference end surface Wa moves after the workpiece model WM is set in the original position 0 is a value which can be obtained by calculation. FIG. 8 shows another state in which the traverse table 17 is moved again a distance L100 toward the left from the position where a contact is made between the reference end surface Wa and the feeler F. The distance L100 in this case is a distance which is predetermined for defining the position of the pivot P where such a pivots movement as indicated by the phantom line of FIG. 8 is performed. The taper portion Wb of the workpiece model WM can be ground by pivoting the swivel table 19 about the pivot P, with the traverse table 17 having been moved through the distance L100 and then, by advancing the grinding wheel G through a distance M10 to a position indicated by the phantom line so as to bring the grinding wheel G into contact with the taper portion Wb.

Unlike the workpiece model WM, a real workpiece W has its reference end surface Wa which is different in axial location from that of the workpiece model WM. The difference in axial location causes a positional deviation of the pivot P, which may results in inaccurate grinding of the taper portion Wb. To avoid this drawback, in the present invention, a memory MEM of a numerical controller 100 shown in FIG. 4 has stored therein a program for calculating a deviation of the reference end surface Wa of the real workpiece W from that of the workpiece model WM (i.e., a deviation of the pivot location from that in the case of the workpiece model WM) and for compensating feed amounts of the traverse table 17 and the wheel head 21 in the taper grinding operation for the calculated deviation. An operation processor CPU of the numerical controller 100 reads out the content of the memory MEM for controlling the taper grinding operation.

The procedure of grinding the taper portion Wb of the workpiece W which has the reference end surface Wa at an axial position deviated from an ideal or designed axial position will be described hereafter with reference to FIGS. 9 through 14. First of all, the workpiece W is set between the centers 13 and 14 as indicated by the solid line in FIG. 9. In this state, when an instruction for starting a taper grinding operation is issued, the operation processor CPU reads out set values L10, L50, L100, M10 and $\theta$ (M10 and $\theta$ shown in FIGS. 12 and 13) in step 101. The values L10, L50 and L100 represent feed amounts of the traverse table 17 in the case of the workpiece model WM, the value M10 represents a feed amount of the grinding wheel G in a direction perpendicular to the X-axis direction in the case of the workpiece model WM, and the value $\theta$ represents a pivot angle of the swivel table 19. Subsequently, the traverse table 17 is moved from the original position 0 by the distance L10 towards the left so as to move the workpiece W and the work head 11 to the positions indicated by the phantom line in FIG. 9. (Step 102) At this time, the pivot P is also moved by the distance L10 in the same direction. After the feeler F of the end surface measuring device 30 is advanced (step 103), the traverse table 17 is moved toward the right until the reference end surface Wa of the workpiece W comes into engagement with the feeler F. (step 104) When a signal from the end surface measuring device 30 is generated, the rightward movement of the traverse table 17 is discontinued and the rightward feed amount Y is detected. (steps 105 and 106) The detection of the feed amount Y can be done by counting the number of pulses which are distributed to a drive unit DUZ of the servomotor 18 during the rightward feed movement. The feeler F is then retracted (step 107), and the substantial feed amount Ls of the traverse table 17, namely, an amount Ls which the workpiece W is substantially moved from the original position indicated by the solid line in FIG. 9 until the reference end surface Wa is brought into engagement with the feeler F as shown in FIG. 10 is calculated using an equation defined in step 108.

Figure 10:
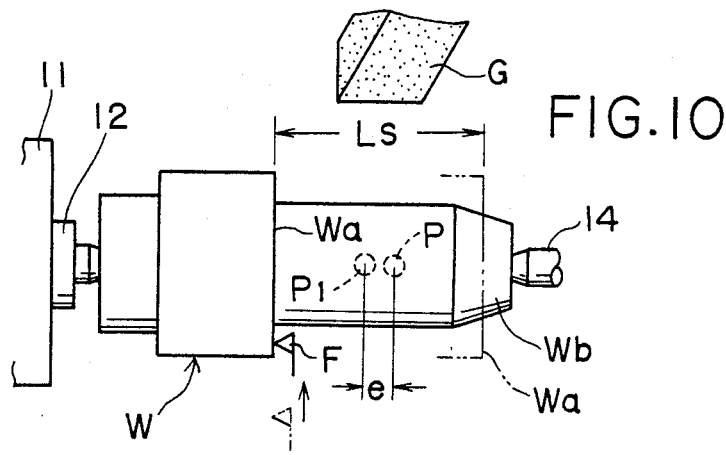
Figure 11:
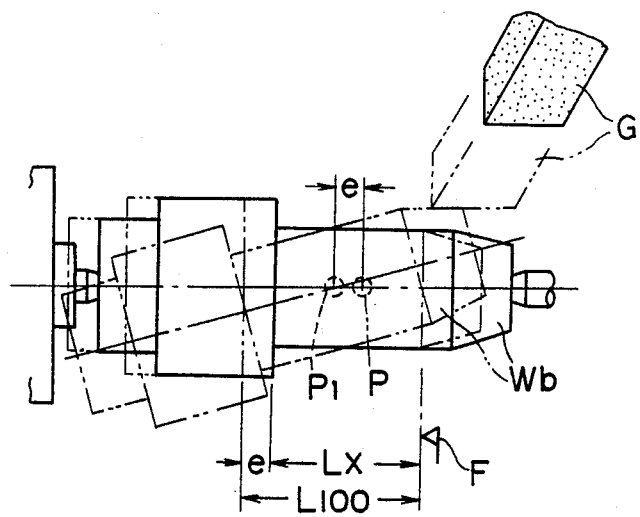

Thereafter, in the case of the workpiece model WM, the swivel table 17 is pivoted as shown in FIG. 8 about the pivot P whose position in the Z-axis direction is spaced the predetermined amount L100 from a position determined upon engagement of the reference end surface Wa with the feeler F. However, in the case of the real workpiece W, the referenced end surface Wa is deviated by an error e from the ideal position as shown in FIG. 10, and if the swivel table 19 were pivoted about the pivot P1 located at a position which is spaced the predetermined amount L100 from a position determined when the reference end surface Wa comes into contact with the feeler F, the workpiece W would be moved as indicated by the phantom line in FIG. 11, whereby it would become impossible to engage the taper portion Wb precisely with the grinding wheel G. That is, although the pivot P shown in FIG. 11 is located at an ideal or desiged position, the actual position P1 of the pivot P is deviated by the error e from the ideal position. Accordingly, the feed amount Lx (FIG. 11) of the traverse table 17 after the engagement of the feeler F with the reference end surface Wa and the feed amount Mx (FIG. 13) of the grinding wheel G are compensated for the error e in the following manner.

More specifically, the error or deviation amount e is calculated by an equation $e = Ls - L50$, and the feed amount Lx is calculated by the following equation.

$$Lx = L100 - e \qquad (1)$$

Figure 12:
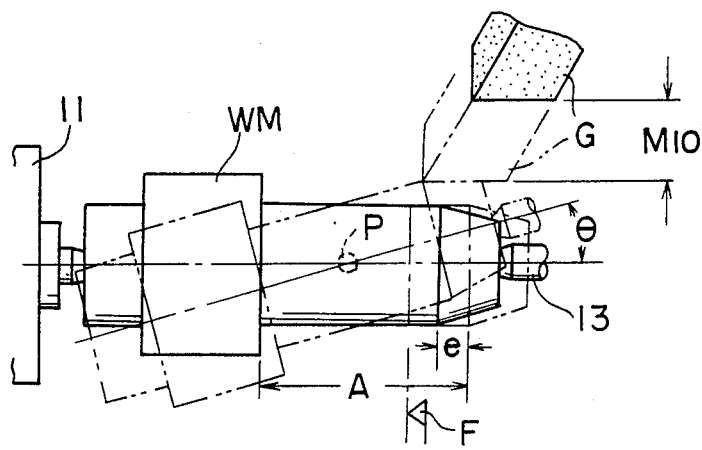
Figure 13:
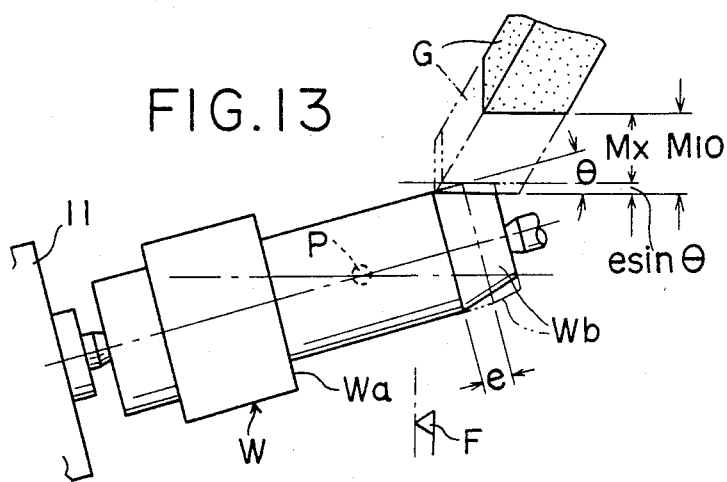
Figure 14:
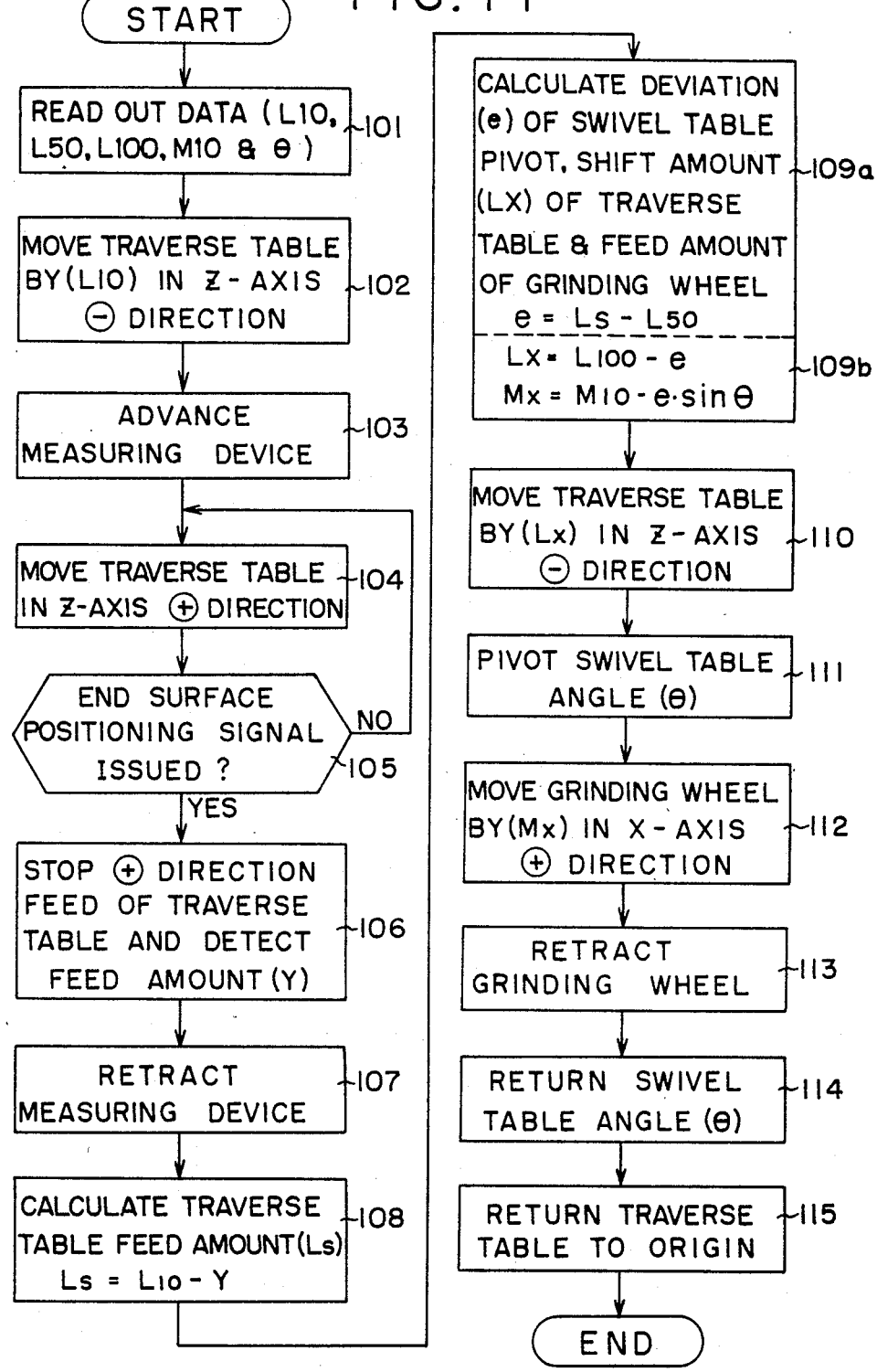
FIG. 14 is a flow chart of processings executed by the numerical controller for controlling the machine tool shown in FIG. 5 in the grinding of the taper portion of the workpiece.

Further, assuming now that the pivot angle of the swivel table 19 and the advance amount of the grinding wheel G relative to the workpiece model WM are respectively predetermined amounts $\theta$ and M10, as shown in FIG. 12, the compensated feed amount Mx of the grinding wheel G in the case of the real workpiece W is calculated by the following equation.

$$\begin{aligned} Mx &= M10 - e \cdot \sin\theta \\ &= M10 - (Ls - L50)\sin\theta \end{aligned} \qquad (2)$$

Accordingly, the compensated amounts Lx and Mx defined by the equations (1) and (2) are calculated by the operation processor CPU of the numerical controller 100 shown in FIG. 4 based upon the set or measured values L10, L50, L100, M10, $\theta$ and Ls. (steps 109a and 109b in FIG. 14). Based upon the calculated values, the servomotor 18 is controlled to move the traverse table 17 by the compensated amount Lx toward the left in the Z-axis direction (step 110), and the swivel drive servomotor 20 is controlled to pivot the swivel table 19 through the predetermined angle $\theta$. (step 111) In addition, the wheel feed servomotor 22 is controlled to advance the grinding wheel G by the comensated amount Mx in a direction perpendicular to the Z-axis direction (step 112), whereby the taper portion Wb is ground to a desired dimension.

Figure 9:
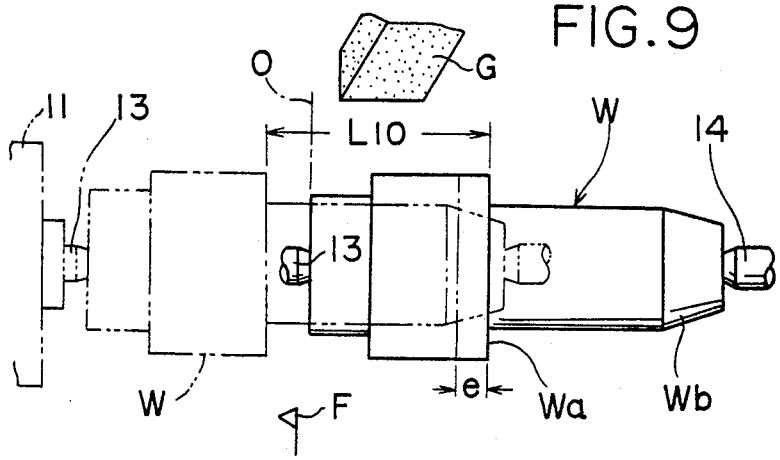
FIGS. 9, 10, 11, 12 and 13 are explanatory views illustrating operational steps in grinding a taper portion of a workpiece in the grinding machine according to the present invention.

Upon completion of the grinding, the grinding wheel G is retracted, and the swivel table 19 is reversely pivoted by the predetermined angle $\theta$, and the traverse table 17 is returned to the original position shown in FIG. 9. (steps 113-115).

Obviously, numerous modifications and variations of the present invention are possible in light of the above teachings. It is therefore to be understood that within the scope of the appended claims, the present invention may be practiced otherwise than as specifically described herein.

What is claimed is:

1. A numerical control grinding machine, comprising:

a bed;

a traverse table movably mounted on said bed;

a swivel table mounted on said traverse table and pivotable about a pivot secured to said traverse table;

workpiece support means mounted on said swivel table for supporting a workpiece to be rotatable about an axis which extends in the moving direction of said traverse table;

a grinding wheel mounted on said bed and movable toward and away from said workpiece;

a traverse feed device for moving said traverse table;

a swivel feed device for pivotally moving said swivel table about said pivot;

a wheel feed device for moving said grinding wheel toward and away from said workpiece;

a measuring device engageable with a reference end surface of said workpiece for generating a signal when said reference end surface is located, through movement of said traverse table, at a predetermined position in the moving direction of said traverse table; and a numerical controller for controlling said traverse, swivel and wheel feed devices in response to said signal from said measuring device, said numerical controller including:

first feed control means for controlling said traverse feed device so as to move said traverse table from an original position to a reference detecting position which is determined upon engagement with said reference end surface with said measuring device;

feed amount detection means responsive to said signal for detecting a first feed amount through which said traverse table is moved from said original position to said reference detecting position;

first calculation means for calculating the difference between said first feed amount detected by said feed amount detection means and a first predetermined value, said first predetermined value being indicative of a feed amount through which said traverse table would be moved from said original position to said reference detecting position if a workpiece model were supported by said workpiece support means;

second calculation means for calculating based upon said calculated difference second and third feed amounts through which said traverse table and said grinding wheel are to be moved respectively so that said taper portion of said workpiece can be ground to a desired dimension;

second feed control means for controlling said traverse feed device to move said traverse table by said calculated second feed amount from said reference detecting position;

third feed control means for controlling said swivel feed device to pivot said swivel table by a predetermined angle; and fourth feed control means for controlling said wheel feed device to move said grinding wheel toward said workpiece by said calculated third feed amount.

2. A numerical control grinding machine as set forth in claim 1, wherein said second calculation means comprises:

first compensation means for calculating said second feed amount by compensating a second predetermined value for said calculated difference, said second predetermined value being indicative of a feed amount through which said traverse table would be moved from said reference detecting position to axially position said taper portion of said workpiece model relative to said grinding wheel if said workpiece model were supported by said workpiece support means; and second compensation means for calculating said third feed amount by compensating a third predetermined value for said calculated difference, said third predetermined value being indicative of a feed amount through which said grinding wheel would be advanced to grind said taper portion of said workpiece model to a desired dimension if said workpiece model were supported by said workpiece support means.

3. A numerical control grinding machine as set forth in claim 2, wherein:

said feed amount detection means detects said first feed amount based upon the operational amount of said traverse feed device controlled by said first feed control means.

4. A numerical control grinding machine as set forth in claim 3, wherein:

said first compensation means calculates said second feed amount by subtracting said calculated difference from said second predetermined value; and said second compensation means calculates said third feed amount by substracting from said third predetermined value a component of sine which is calculated based upon said calculated difference and said predetermined angle through which said swivel table is pivoted by said swivel feed device.

5. A numerical control grinding machine as set forth in claim 4, wherein:

said grinding wheel is movable in a direction which intersects the moving direction of said traverse table at an acute angle.

* * * * *